United States Patent Office 3,086,006
Patented Apr. 16, 1963

3,086,006
WATER-INSOLUBLE MONOAZO-DYESTUFFS AND PROCESS FOR THEIR MANUFACTURE
Konrad Löhe and Joachim Ribka, Offenbach am Main, Germany, assignors to Farbwerke Hoechst Aktiengesellschaft vormals Meister Lucius & Brüning, Frankfurt am Main, Germany, a corporation of Germany
No Drawing. Filed Jan. 23, 1961, Ser. No. 83,945
Claims priority, application Germany July 2, 1960
6 Claims. (Cl. 260—204)

The present invention relates to new water-insoluble monoazo-dyestuffs and to a process for their manufacture; more particularly it relates to water-insoluble monoazo-dyestuffs of the following formula

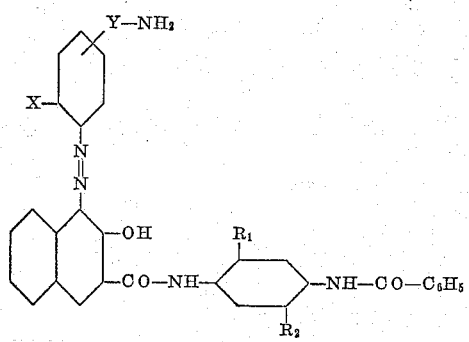

wherein X, $R_1$ and $R_2$ represent a hydrogen atom, a halogen atom, an alkyl or alkoxy group, and Y stands for the carbonyl or sulfonyl group.

We have found that valuable, water-insoluble monozodyestuffs are obtained by coupling the diazonium compounds of amines of the general formula

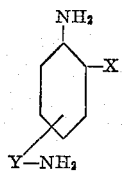

wherein X represents hydrogen, a halogen atom, an alkyl or alkoxy group and Y stands for a CO or $SO_2$ group, with coupling components of the general formula

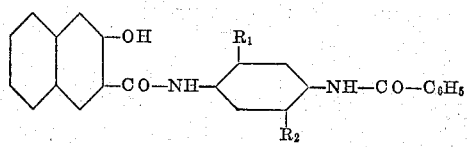

wherein $R_1$ and $R_2$ represent hydrogen, a halogen atom, an alkyl or alkoxy group.

As diazo components there are preferably used in the process of the present invention meta- and para-aminobenzene-sulfonic acid amides or meta- and para-aminobenzene-carboxylic acid amides, for example 1-aminobenzene-3-carboxylic acid amide or 1-aminobenzene-4-carboxylic acid amide, or 1-aminobenzene-3-sulfonic acid amide or 1-aminobenezene-4-sulfonic acid amide, 1-amino-2-halogenbenzene-5-carboxylic acid amides or 1-amino-2-halogenbenzene-5-sulfonic acid amides, 1-amino-2-alkylbenzene-5-carboxylic acid amides or 1-amino-2-alkylbenzene-5-sulfonic acid amides, 1-amino-2-alkoxybenzene-5-carboxylic acid amides or 1-amino-2-alkoxybenzene-5-sulfonic said amides.

The 1-(2',3'-hydroxynaphthoylamino)-4-benzoylaminobenzenes of the indicated formula which are used as coupling components in the process of the present invention are easily accessible by known methods, for example by reacting 2,3-hydroxynaphthoic acid with the corresponding 1-amino-4-benzoylaminobenzenes in a suitable solvent such, for example, as xylene, chlorobenzene, toluene or pyridine, in the presence of a condensation agent such, for example, as phosphorus trichloride.

The dyestuffs can be prepared by known methods, for example by coupling the diazonium compounds with the coupling components in an aqueous medium in the presence of a wetting or dispersing agent.

The dyestuffs obtained by the present process are water-insoluble pigments which are distinguished by a good fastness to solvents. They are suitable for the preparation of colored lacquers or lake formers, for coloring solutions or products of acetylcellulose, nitrocellulose, natural resins or synthetic resins such as polymerisation or condensation resins, for example, aminoplasts, phenoplasts, and of polystyrene, polyolefins, for example, polyethylene or polypropylene, polyacrycl compounds, polyvinyl compounds, for example polyvinyl chloride or polyvinyl acetate, rubber, casein or silicone resins. They are further suitable for pigment printing on a substratum, especially on a textile fiber, and also on two dimensional structures such as paper.

The new dyestuffs can also be used for other purposes, for example, in finely divided form for coloring rayon of viscose or cellulose ethers and cellulose esters, polyamides or polyurethanes in the spinning solution or for the coloration of paper.

In comparison with the water-insoluble monoazo-dyestuffs of similar compositions which are known from German Patent 673,082, the dyestuffs obtained by the present process are distinguished by a better fastness to solvents.

The following example serves to illustrate the invention but it is not intended to limit it thereto, the parts being by weight unless otherwise stated, and the relationship of parts by weight to parts by volume being the same as that of the kilogram to the liter.

Example 17.1 parts of 1-amino-2-chlorobenzene-5-carboxylic acid amide are dissolved in the hot with 50 parts by volume of 5 N hydrochloric acid and 175 parts by volume of water and, after the addition of ice, the solution is diazotized at 5° C. with 20 parts by volume of a 5 N solution of sodium nitrite. The diazo solution is clarified and united at 50° C. with an aqueous suspension of 21.7 parts of 1-(2',3'-hydroxynaphthoylamino)-2-methyl-4-benzoylaminobenzene which is prepared by dissolving this compound in dilute sodium hydroxide solution and precipitation with glacial acetic acid in the presence of a reaction product from about 20 mols of ethylene oxide and 1 mol of octadecyl alcohol. The dyestuff separated after completion of the coupling is filtered with suction, washed and dried. It is an orange-red powder.

The nitrocellulose lacquers produced with this dyestuff yield a yellowish-red lacquer finish possessing a good fastness to overspraying. By incorporating the dyestuff in polyvinyl chloride, a yellowish-red coloration possessing a very good fastness to bleeding is obtained.

In the following table further components are listed which can be used in the process of the invention, and the tints produced by forming the monoazo-dyestuffs from these components in substance.

| Diazo component | Coupling component | Tint |
|---|---|---|
| 1-amino-2-methylbenzene-5-carboxylic acid amide. | 1-(2',3'-hydroxynaphthoyl-amino)-2-methyl-4-benzoylaminobenzene. | Red. |
| 1-aminobenzene-3-carboxylic acid amide. | do | Orange red. |
| 1-aminobenzene-4-carboxylic acid amide. | do | Red. |
| 1-aminobenzene-3-sulfonic acid amide. | do | Red orange. |
| 1-amino-2-chlorobenzene-5-sulfonic acid amide. | do | Red. |
| 1-amino-2-chlorobenzene 5 carboxylic acid amide. | 1-(2',3'-hydroxynaphthoyl amino)-4-benzoylaminobenzene. | Yellow red. |
| 1-aminobenzene 3-sulfonic acid amide. | do | Red orange. |
| 1-amino-2-methylbenzene-5-carboxylic acid amide. | 1-(2',3'-hydroxynaphthoyl-amino)-2-methyl-4-benzoylamino-5-methoxybenzene. | Red. |
| 1-amino-2-methoxybenzene-5-carboxylic acid amide. | 1-(2',3'-hydroxynaphthoyl-amino)-2-chloro-4-benzoylamino-5-methylbenzene. | Bluish red. |
| Do | 1-(2',3'-hydroxynaphthoyl-amino)-2-methyl-4-benzoylaminobenzene. | Do. |
| 1-aminobenzene-4-sulfonic acid amide. | do | Red. |
| 1-amino-2-methoxybenzene-5-carboxylic acid amide. | 1-(2',3'-hydroxynaphthoylamino)-4-benzoylaminobenzene. | Bluish red. |
| Do | 1-(2',3'-hydroxynaphthoylamino)-2-methoxy-4-benzoylaminobenzene. | Do. |
| 1-aminobenzene-3-sulfonic acid amide. | 1-(2',3'-hydroxynaphthoylamino)-2-chloro-4-benzoylamino-5-methoxybenzene. | Red orange. |
| 1-amino-2-chlorobenzene-5-carboxylic acid amide. | 1-(2',3'-hydroxynaphthoylamino)-2-chloro-4-benzoylamino-5-methylbenzene. | Yellowish red. |
| Do | 1-(2',3'-hydroxynaphthoylamino)-2-chloro-4-benzoylaminobenzene. | Orange. |
| 1-amino-2-methoxybenzene-5-carboxylic acid amide. | 1-(2',3'-hydroxynaphthoyl-amino)-3-chloro-4-benzoylaminobenzene. | Bluish red. |
| 1-amino-2-methylbenzene-5-carboxylic acid amide. | do | Red. |
| 1-amino-2-methoxybenzene-5-carboxylic acid amide. | 1-(2',3'-hydroxynaphthoylamino)-3-methoxy-4-benzoylaminobenzene. | Bluish red. |
| Do | 1-(2',3'-hydroxynaphthoylamino)-3-methyl-4-benzoylaminobenzene. | Do. |
| 1-amino-2-chlorobenzene-5-carboxylic acid amide. | do | Red orange. |
| 1-amino-2-methylbenzene-5-carboxylic acid amide. | do | Red. |
| 1-aminobenzene-3-sulfonic acid amide. | do | Yellowish red. |
| 1-aminobenzene-4-sulfonic acid amide. | do | Light red. |
| 1-aminobenzene-4-carboxylic acid amide. | do | Red. |
| 1-amino-2-methoxybenzene-5-carboxylic acid amide. | 1-(2',3'-hydroxynaphthoylamino)-2-methoxy-4-benzoylamino-5-methylbenzene. | Bluish red. |
| 1-amino-2-methylbenzene-5-carboxylic acid amide. | do | Red. |
| 1-amino-2-chlorobenzene-5-carboxylic acid amide. | 1-(2',3'-hydroxynaphthoylamino)-2-methyl-4-benzoylamino-5-chlorobenzene. | Red. |
| 1-amino-2-methoxybenzene-5-carboxylic acid amide. | do | Bluish red. |
| Do | 1-(2',3'-hydroxynaphthoylamino)-2,5-dimethyl-4-benzoylaminobenzene. | Do. |
| 1-amino-2-chlorobenzene-5-carboxylic acid amide. | do | Orange. |
| 1-amino-2-methoxybenzene-5-carboxylic acid amide. | 1-(2',3'-hydroxynaphthoylamino)-2,5-dichloro-4-benzoylaminobenzene. | Red. |
| 1-amino-2-chlorobenzene-5-carboxylic acid amide. | do | Red orange. |
| 1-amino-2-methoxybenzene-5-carboxylic acid amide. | 1-(2',3'-hydroxynaphthoylamino)-2-chloro-4-benzoylamino-5-methoxybenzene. | Bluish red. |
| Do | 1-(2',3'-hydroxynaphthoylamino)-2-methyl-4-benzoylamino-5-methoxybenzene. | Do. |
| 1-amino-2-methylbenzene-5-carboxylic acid amide. | 1-(2',3'-hydroxynaphthoylamino)-2-chloro-4-benzoylaminobenzene. | Red. |
| Do | 1-(2',3'-hydroxynaphthoylamino)-2-methoxy-4-benzoylamino-5-chlorobenzene. | Red. |
| 1-amino-2-methylbenzene-4-carboxylic acid amide. | 1-(2',3'-hydroxynaphthoylamino)-2,5-dimethyl-4-benzoylaminobenzene. | Red. |
| 1-amino-2-chlorobenzene-4-carboxylic acid amide. | 1-(2',3'-hydroxynaphthoylamino)-3-methyl-4-benzoylaminobenzene. | Red. |
| 1-amino-2-methoxybenzene-4-carboxylic acid amide. | 1-(2',3'-hydroxynaphthoylamino)-2-methyl-4-benzoylaminobenzene. | Red. |

We claim:

1. The water-insoluble monoazo-dyestuffs having the formula wherein X, $R_1$ and $R_2$ are members selected from the group consisting of hydrogen, chlorine, methyl and methoxy.

2. The water-insoluble monoazo-dyestuff having the formula

3. The water-insoluble monoazo-dyestuff having the formula

4. The water-insoluble monoazo-dyestuff having the formula
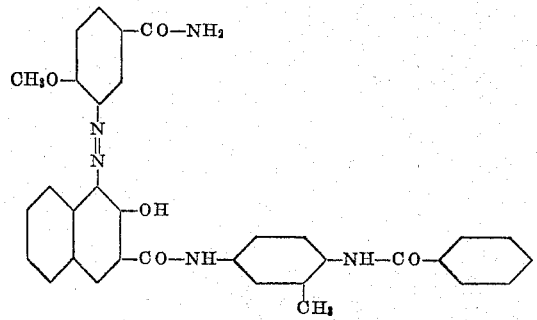
5. The water-insoluble monoazo-dyestuff having the formula
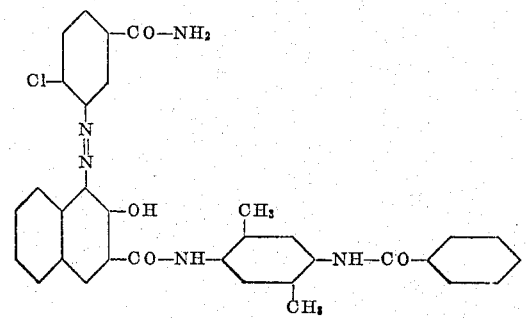
6. The water-insoluble monoazo-dyestuff having the formula
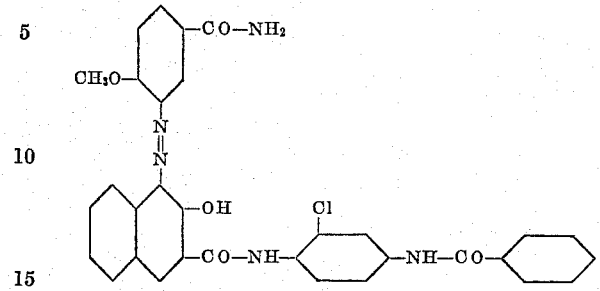
References Cited in the file of this patent
UNITED STATES PATENTS
| | | |
|---|---|---|
| 2,025,582 | Fischer | Dec. 24, 1935 |
| 2,111,890 | Fischer | Mar. 22, 1938 |
| 2,186,226 | Zerweck et al. | Jan. 9, 1940 |
| 2,262,464 | Marriott et al. | Nov. 11, 1941 |
| 2,742,459 | Fischer | Apr. 17, 1956 |
| 2,899,421 | Fischer | Aug. 11, 1959 |
FOREIGN PATENTS
| | | |
|---|---|---|
| 818,675 | France | Oct. 1, 1937 |